United States Patent

Barnett

Patent Number: 6,011,101
Date of Patent: Jan. 4, 2000

[54] CAST MARBLE OBJECTS HAVING SUPERIOR DEPTH CHARACTERISTICS AND COLOR SEPARATION AND METHODS FOR MAKING THE SAME

[76] Inventor: Stephen Barnett, 365 Merriomon Ave., Asheville, N.C. 28801

[21] Appl. No.: 09/020,370

[22] Filed: Feb. 9, 1998

Related U.S. Application Data

[62] Division of application No. 08/596,547, Feb. 5, 1996, Pat. No. 5,820,799.

[51] Int. Cl.[7] .................................................. C09D 5/29
[52] U.S. Cl. ......................... 524/430; 264/73; 264/245; 264/331.18
[58] Field of Search .............................. 523/171; 264/73, 264/245, 331.18

[56] References Cited

U.S. PATENT DOCUMENTS 4,433,070  2/1984  Ross et al. ............................... 523/171

*Primary Examiner*—Edward J. Cain
*Attorney, Agent, or Firm*—Nexsen Pruet Jacobs & Pollard, LLP

[57] ABSTRACT

A process for making a marble casting material comprising a solidified polymer blend having superior depth characteristics is disclosed. The process involves the partial intermingling of two or more partially incompatible marble casting resins that are not intended to be normally used in combination. Due to the partial incompatibility, when the partially intermingled marble casting resins solidify, a marble effect is created.

18 Claims, 1 Drawing Sheet

CAST MARBLE OBJECTS HAVING SUPERIOR DEPTH CHARACTERISTICS AND COLOR SEPARATION AND METHODS FOR MAKING THE SAME

CROSS-REFERENCE TO RELATED APPLICATIONS

This application is a divisional of U.S. patent application Ser. No. 08/596,547 filed on Feb. 5, 1996, now U.S. Pat. No. 5,820,799 herein incorporated by reference.

BACKGROUND OF THE INVENTION

Aesthically, consumers typically prefer countertops, sinks, tabletops, and other similar objects to be made from materials resembling marble. However, real marble is both very expensive and very heavy. Therefore, in most instances, using real marble is unrealistic. Accordingly, marble substitutes, known as densified marble casting materials, are typically used. These materials comprise resins that upon densification, pigmentation, mixing and curing, produce a marble effect. To date, individual marble casting materials have had varying degrees of success due to faults within their compositions, design, and appearance.

Accordingly, there is room for improvement within the art.

OBJECTS OF THE INVENTION

It is an object of the invention to provide a densified cast marble object for use in countertops, sinks, tabletops, and other similar products that is aesthically pleasing.

It is a further object of the invention to provide a cast marble object for use in countertops, sinks, tabletops, and other similar products that is capable of many different color combinations while still providing for visual color separation.

It is a still further object of the invention to provide a cast marble object for use in countertops, sinks, tabletops, and other similar products that has superior depth characteristics.

It is a still further object of the invention to provide a cast marble object for use in countertops, sinks, tabletops, and other similar objects that may have a transparent to translucent to opaque appearance.

These and other objects of the invention are achieved by a solidified cast object comprising; a first cured marble casting resin; and a second cured marble casting resin; whereby the first and second marble casting resins are at least partially incompatible.

DETAILED DESCRIPTION OF THE INVENTION

A cast marble object having depth characteristics for use as a decorative surface such as countertops, sinks, tabletops, and other similar products and a method for making the same that meet and achieve the various objects of the invention set forth above will now be described.

Figure 2:
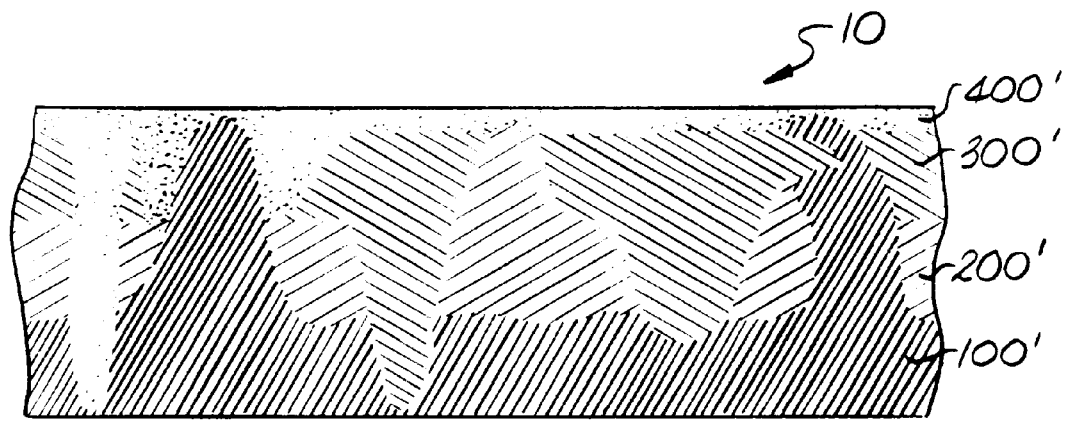
FIG. 2 is a sectional elevation view of a cast object made according to the invention and showing the partial intermingling of mixture levels.

This invention is based upon my discovery that by mixing separate conventional and known marble casting resins of differing compositions that are partially incompatible and not necessarily intended to be mixed together, upon curing, a cast marble object unpredictably superior in qualities and appearance from objects made using cured individual known marble casting resins can be produced. The marble casting resins are partially incompatible and not necessarily intended to be mixed together due to, for example, their different viscosities, densities, or specific gravities. As an example, according to the invention, a cast marble object can be created that has superior depth characteristics. "Depth characteristics" are defined as the colored or white streaks ascending from the bottom of cast object 10 to its surface as shown in FIG. 2, i.e., three dimensional, as compared to conventional streaks that are merely surface features, i.e., two dimensional.

The basic process is as follows:

1. The user selects the two or more conventional marble casting resins that will be used. The number of resins selected is determined by the appearance desired of the final cast object, i.e., number and combination of colors and depth levels. The primary consideration in determining which particular resins should be selected is that the resins must be partially incompatible. Partially incompatible means that, because the resins may have differing densities and/or specific gravities, forming a uniform mixture of the selected resins requires substantial effort, such as by vigorous mixing. However, partially incompatible does not mean the resins cannot be mixed into a uniform composition;

2. The selected resins are individually portioned out into multiple containers with the number of containers representing the number of levels that will be used to form the cast object, as will be described below;

3. If desired, stabilizers may be added to each individual casting resin and mixed therewith. Mixing may be done by use of ordinary or vacuum blenders. Stabilizers are chosen for their ability to provided properties such as: flame retardance, stain resistance, temperature stability, and structural integrity. Stabilizers may, additionally, contain pigment and/or densifiers to affect the composition and/or color of the individual marble casting resins. Densifiers directly contribute to the increased structural strength of the final cast object. Aluminum tri-hydrate (ATH) is a preferred stabilizer/densifier.

However, densifiers and stabilizers are opaque. Therefore, if one wishes to make a transparent or translucent cast object, the use of densifiers/stabilizers must either be minimized or eliminated. In such a situation, pigment alone may be added to an individual marble casting resin to affect its color. When the densifiers are omitted, the cast object produced will have decreased properties described above (although it will still have the superior depth characteristics and color seperation).

Concerning pigment, although liquid pigment may be used, the preferred form for the pigment is powdered because it provides for less color bleeding than liquid pigment.

Figure 1:
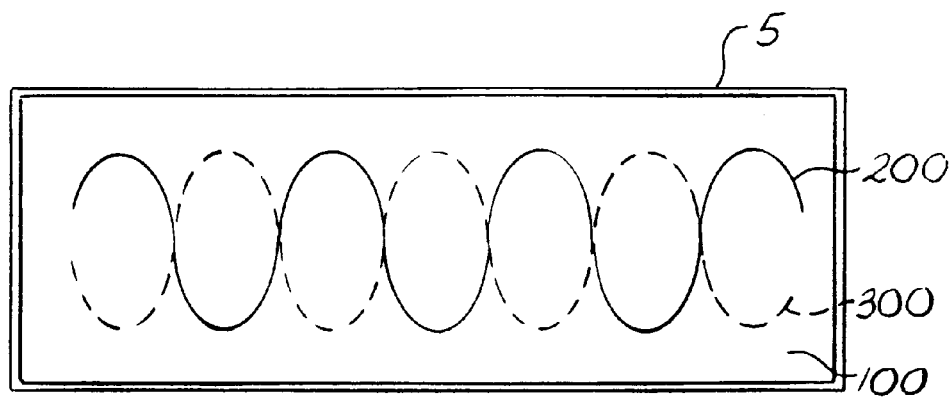
FIG. 1 is a plan view showing the serpentine manner in which the intermediate mixture levels are poured on top of the lowermost mixture level.

Typically, the top level of the cast object will be clear and have no pigment while the lowermost level of the cast object may be opaque due to the stabilizer/densifier and have no pigment. Thus, in such a situation, the top level will be a "see-through" protective covering for the cast object while the lowermost level will give the cast object most of its structural integrity. It was unexpected that in a cast object having as much densifier/stabilizer as used in Example One the clear top level would still be present allowing the appearance of the superior depth characteristics;

4. Each individual marble casting resin mixture is then mixed with its respective manufacturer specified catalyst. When the selected resins normally, i.e., when manufacturer specifications as to catalyst concentration and amounts are added, cure at different rates, the relative amounts of each catalyst must be adjusted so that the resins finish curing at the same time. Upon adding the catalysts, the user has only a limited amount of time to complete the process. Otherwise, the catalyzed resin mixtures will start to gel and be incapable of intermingling as required below;

5. A conventional flat mold 5 of sufficient size to allow a combination of all the marble casting resin mixtures to fill the mold is provided and each mixture is separately poured into the mold to form a multiple level mixture. Typically, mixtures will be poured into the mold in the order of most dense to least dense; however, there is room for variation. Intermediate mixture levels are placed onto the lowermost mixture level in a serpentine manner as shown in FIG. 1 to assist in creating the swirls evident in marble materials;

6. The mixture levels are partially intermingled using, for example, a slotted mixing device, and a serpentine stroke. What is meant by partial intermingling is shown in FIG. 2 where there are still multiple distinct and identifiable mixture levels 100'–400', yet, due to the partial intermingling, parts of the various mixture levels pass through each other in the vertical direction such that some of each mixture may be found on any level. Over-mixing results in the various mixture levels 100'–400' not only becoming partially intermingled, but becoming a single fairly uniform mixture that lacks the cultured marble effect. Under-mixing keeps some of the lower mixture levels down low where they can not be seen or result in a purely stratified cast object rather than an object in which pigment and/or densifier/stabilizer ascends through multiple levels, as shown in FIG. 2. Mixing time is defined by experience and aesthetic requirements. As for the mixing device, slotted mixing devices, e.g., tongue depressors with small slots along their upper lengths, are preferred because they allow some amount of each mixture level to pass over the mixing device and not run them all to the sides of the mold. This results in a better final three dimensional effect, but it is not critical. The serpentine mixing stroke, again, produces the swirls found in cultured marbled materials.

7. The partially intermingled composition is left to sit. During the few minutes before gelling occurs, due to the different densities of the different mixture levels, they will partially settle at different levels. Because these levels may be pigmented with different colors, this results in visual color separation. The sitting time is too short to adversely effect the partial intermingling that has occurred. Upon gelling, the gelled partially intermingled composition will have its final color separation;

8. After gelling, each of the individual mixed and catalyzed mixtures of the partially intermingled mixture produce exothermic reactions due to the catalyst. The heat of this reaction cooks the partially intermingled composition. Cooking continues until the material within the mold has entirely cured. Cooking is complete when the partially intermingled composition has solidified and cooled into a cast solidified material. After cooking, the solidified material will have shrunk and therefore moved away from the walls of the mold; and 9. The cope, i.e., the sides of the solidified material opposite to the mold bottom and sides, are then machined to produce whatever cast marble object is desired.

Having described the basic and general steps of the invention, two detailed examples of methods for making cast marble objects having superior depth characteristics will now be described. As mentioned, these are strictly examples, and the invention covers all combinations of marble casting resins, pigments, and stabilizer/densifiers that fall within the requirements set forth herein with respect to resin incompatibility, etc.

EXAMPLE ONE

In Example One, a cast marble object having superior depth characteristics and color separation, is opaque and moderately densified, and should be flame retardant, stain retardant, temperature stable, and structurally strong was produced.

The individual marble casting resins selected were PLEXMAR 140 and HK 0220. PLEXMAR 140 is an orthophthalic low reactivity, high viscosity acrylic modified unsaturated polyester marble casting resin made by Plexmar Resins, Inc. of Houston, Tex. HK 0220 is a 100% isophthalic resilient, light stabilized medium viscosity marble casting resin produced by HK Research Corporation of Hickory, N.C. Both casting resins are clear and substantially colorless after curing. Traditionally, neither casting resin is intended to be used with the other; they are intended to be used separately. Furthermore, at least because PLEXMAR 140 is high viscosity and HK 0220 is medium viscosity, and HK 0220 is of a lower density than PLEXMAR 140, the two resins are partially incompatible, forming distinct phases unless vigorously mixed. Note that as used in the context of this paragraph, the terms high, medium, low, etc., are recognized as standard terms in the art and industry.

The following mixtures were prepared for use in combination with a conventional rectangular flat mold of a size of 13" by 26". One skilled in the art would recognize that volumes described below would have to be modified in accordance with changes in mold sizes. Furthermore, the parameters provided below were determined at an ambient temperature of 70° F. and would also have to be modified in accordance with changes in temperature, as one skilled in the art would recognize.

Mixture 1: 40 ounces of PLEXMAR 140 thoroughly mixed with 320 grams of ATH. The ATH densified the PLEXMAR 140 and provided a desired amount of opacity to the normally pigmentless PLEXMAR. When the entire process is completed, mixture 1 will form the lowermost and primary structural level 100' of the cast object, i.e., help give the cast object its structural integrity.

Mixture 2: 15 ounces of HK 0220 thoroughly mixed with 225 grams of ATH. Additionally, pigment was thoroughly mixed into this mixture. The amount of pigment added is strictly an aesthetic selection because it neither critically influences the kinetics of the reactions nor affects the mixture density.

Mixture 3: 15 ounces of HK 0220 thoroughly mixed with 150 grams of ATH. Pigment was also added to this mixture. This pigment color may be the same or different from the previous pigment. Again, the amount of pigment added is not critical.

Mixture 4: 24 ounces of PLEXMAR 140, 12 ounces of HK 0220, and 100 grams of ATH, all thoroughly mixed. Because no pigment is added to mixture 4 and the amount of opaque ATH used is fairly small in relation to the amount of PLEXMAR 140 and HK 0220, mixture 4 will still be relatively colorless and transparent upon curing and form a clear topcoat 400' to the final cast object.

Each of these mixtures is well blended to result in a uniform composition and the elimination of air bubbles.

Vacuum blenders may be used. Mixture density decreases from mixture 1 to mixture 4.

Concerning catalyzation, while both PLEXMAR 140 and HK 0220 use the same catalyst, namely methyl ethyl ketoneperoxide (MEKP), when MEKP is added per manufacturer recommendations as to amount and concentration, the two marble casting resins cure at different rates. Accordingly, because it is imperative that the various resin mixtures finish curing at the same time to reduce separation between mixture levels, the formation of air pockets, and other undesirable results, manufacturer recommendations concerning the amount of catalyst added must be deviated from. For the four mixtures set forth above, MEKP in the amounts of 30 ml, 7.5 ml, 7.5 ml, and 24 ml, were added, respectively. The four catalyzed resin mixtures were then further blended and the clock started (t=0) because with these amounts, the user has less than twenty-five minutes to complete the intermingling since at t>=+25 minutes, the four catalyzed resin mixtures will start to gel, rendering them incapable of the required intermingling.

At about t=+5 minutes past catalyzation, mixture 1 was poured normally into the 13" by 26" mold and allowed to diffuse throughout the entire mold and form bottom level 100.

At about t=+10 minutes past catalyzation, mixture 2 is poured on top of bottom level 100 in a serpentine manner, as shown in FIG. 1. Immediately thereafter, mixtures 3 and 4 are sequentially poured over mixtures 1 and 2, and in that order to form layers 300' and 400'. While mixture 3 is poured out in serpentine manner, mixture 4 is not. It should be noted that for this example, the order of pouring the mixtures is from most dense to least dense.

A slotted mixing device was then used to partially intermingle the four individual mixture levels. A serpentine stroke is preferred over a straight stroke so as to provide the streaks evident in cultured marble. For the mold size used and a medium paced stroke, stroke time was about one (1) minute. This stroke time results in the middle two pigmented levels being partially distributed across the entire thickness of the mold, i.e., from top to bottom. When viewed through the clear fourth level, this gives the appearance of depth. Before gelling occurs, the moderately densified first level 100 will largely settle back to the bottom of mold 5 to form the base of the cast object while the other levels rise and fall according to their densities to create the color separation.

At approximately t=+25 minutes from the original catalyzation of the four marble casting resin mixtures, the partially intermingled composition gels. The composition then heats up and cooks itself via the exothermic curing reaction. After cooking is completed, the resulting solidified and slightly-shrunk slab was then machined, polished, etc., to provide an opaque object having a surface with superior depth characteristics and color separation as well as the desirable characteristics provided by the ATH.

EXAMPLE TWO

In Example Two, a cast object that is transparent to translucent and has superior depth characteristics and color separation was produced.

The following mixtures were used in combination with the same 13" by 26" mold as Example One and at the same ambient conditions:

Mixture 1: 100 ounces of PLEXMAR 140, no pigment or ATH. MEKP amount: 75 ml.

Mixture 2: 5 ounces of HK 0220 thoroughly mixed with pigment. MEKP amount: 2.5 ml.

Mixture 3: 5 ounces of HK 0220 thoroughly mixed with pigment of the same or different color. It is also possible to use any other small amount of HK 0220 rather than 5 ounces. MEKP amount: 2.5 ml per 5 ounces of HK 0220. The densities of mixtures 2 and 3 are the same, thus, they can be poured into the mold and on top of the first mixture in any order.

Finally, an optional fourth mixture comprising a small amount of HK 0220 thoroughly mixed with a small amount of accent pigment may be used. MEKP used: 0.5 ml/ounce HK 0220.

The remaining steps in the process were generally carried out as in Example One. To assure proper separation between mixtures 2 and 3, which have the same density, care should be taken when pouring them in the serpentine manner not to pour one entirely directly on top of the other, e.g., they should be poured out of phase as shown in FIG. 2; they may cross each other at times, but they should mainly contact the first mixture level. (FIG. 1) After the intermingling, the HK 0220 levels become trapped within the highly viscous and denser clear PLEXMAR 140 level, which generally fills the mold.

Upon completion of curing, a transparent cast object was produced that had superior depth characteristics. Of course, since no ATH was used, the characteristics attendant with its use were absent. However, the cast object still had enough structural integrity for use as, for example, picture frame moldings and counter tops which are not frequently impacted during use.

The above description is given in reference to cast marble objects having depth characteristics and method for making the same. However, it is understood that many variations are apparent to one of ordinary skill in the art from a reading of the above specification and such variations are within the spirit and scope of the instant invention as defined by the following appended claims.

That which is claimed:

1. A solidified cast object comprising:

a first cured marble casting resin; and a second cured marble casting resin;

whereby said first and second marble casting resins are at least partially incompatible.

2. The cast object according to claim 1, wherein:

said first casting resin is high viscosity;

said second casting resin is medium viscosity; and said second casting resin has a lower density than said first casting resin.

3. The cast object according to claim 1, wherein said first and second marble casting resins normally cure at different rates.

4. The cast object according to claim 1, wherein said cast object has observable depth characteristics.

5. The cast object according to claim 1, wherein at least one of said marble casting resins is pigmented.

6. The cast object according to claim 1, wherein at least one of said casting resins is treated with a densifier.

7. The cast object according to claim 6, wherein said densifier is aluminum tri-hydrate.

8. The cast object according to claim 1, wherein said cast object is at least translucent.

9. The cast object according to claim 1, wherein said cast object is opaque.

10. The cast object according to claim 1, wherein said first and second marble casting resins are partially intermingled.

11. A solidified cast object formed by the process steps of:

preparing a first mixture comprising a first marble casting resin and a first catalyst for said first marble casting resin;

preparing a second mixture of a second marble casting resin, a second catalyst for said second marble casting resin, and pigment; said first and second marble casting resins being at least partially incompatible;

preparing a third mixture comprising said second marble casting resin, said second catalyst and pigment;

pouring said first mixture into a mold to form a first mixture level;

pouring said second mixture into said mold and on top of said first mixture level to form a second mixture level;

pouring said third mixture into said mold and on top of said first and second mixture levels to form a third mixture level;

partially intermingling said first, second, and third mixture levels to form a partially intermingled composition; and allowing a curing reaction to occur to cook said partially intermingled composition to form said solidified cast object.

12. A solidified cast object, comprising at least partially intermingled first, second and third mixtures;
wherein said first mixture comprises:
a first marble casting resin; and
a first catalyst;
wherein said second mixture comprises:
a second marble casting resin; and
a second catalyst at least partially incompatible with said first catalyst; and
a first pigment; and
wherein said third mixture comprises:
said second marble casting resin;
said second catalyst; and
a second pigment;
wherein said first, second and third mixtures are at least partially incompatible.

13. The solidified cast object as recited in claim 12, wherein said first marble casting resin is orthophthalic and high viscosity; and said second marble casting resin is isophthalic and medium viscosity.

14. The solidified cast object as recited in claim 12, wherein said first marble casting resin is denser than said second marble casting resin.

15. The solidified cast object as recited in claim 12, wherein said second and third mixtures are each disposed in a serpentine pattern within said first mixture.

16. The solidified cast object as recited in claim 12, wherein said first and second catalysts are provided in amounts which ensures that said first, second and third mixtures finish curing at substantially the same time.

17. The solidified cast object as recited in claim 12, further comprising an intermingled fourth mixture;
wherein said fourth mixture comprises:
said first marble casting resin;
said second marble casting resin;
said first catalyst; and
said second catalyst;
wherein said first, second, third and fourth mixtures are at least partially incompatible.

18. The solidified cast object as recited in claim 17, wherein said first mixture comprises:
an orthophthalic low reactivity, high viscosity acrylic modified unsaturated polyester marble casting resin;
aluminum tri-hydrate; and
methyl ethyl ketone peroxide;
wherein said second mixture comprises:
an isophthalic resilient, light stabilized medium viscosity marble casting resin;
aluminum tri-hydrate;
said first pigment; and
methyl ethyl ketone peroxide;
wherein said third mixture comprises:
an isophthalic resilient, light stabilized medium viscosity marble casting resin;
aluminum tri-hydrate;
said second pigment; and
methyl ethyl ketone peroxide; and
wherein said fourth mixture comprises:
an orthophthalic low reactivity, high viscosity acrylic modified unsaturated polyester marble casting resin;
an isophthalic resilient, light stabilized medium viscosity marble casting resin;
aluminum tri-hydrate; and
methyl ethyl ketone peroxide.

* * * * *